Patented Mar. 20, 1928.

1,662,930

UNITED STATES PATENT OFFICE.

PER LALAND, OF HOVIK, NEAR OSLO, NORWAY, ASSIGNOR TO NYEGAARD & CO., A/S, OF OSLO, NORWAY.

BACTERICIDAL PREPARATION.

No Drawing. Application filed May 19, 1926, Serial No. 110,265, and in Norway March 15, 1926.

This invention relates to the manufacture of bactericidal preparations containing silver incorporated into an organic substance and has for its object an improved bactericide containing colloidal silver.

An important feature of the present invention consists therein that the preparation contains colloidal silver incorporated into a glucoside or into a mixture of several glucosides. The glucosides which are to be considered in this connection are on the first hand such glucosides which are in themselves astringents or which readily decompose into compounds with astringent properties. As is well known a great number of glucosides are of this nature. As a few examples may be mentioned the glucosides of Rhizoma Rhei, the various tannines, cascarine, aloin etc.

According to the invention the preparation is preferably given a slightly acid character. This is obtained by introducing into the preparation a substance (such as for example boric acid or phosphoric acid) which contain or readily gives off hydrogen ions but which are at the same time of such a character as not to effect precipitation in any of the constituents of the preparation.

The invention comprises the preparation itself as well as the method of producing the same and the intermediate products produced in the course of manufacture.

A preparation of the character referred to above and containing a particularly large proportion of colloidal silver incorporated into a glucoside and containing albumen as a protective colloid and boric acid as a means to bring about acidity may for example be produced in the following manner:

A colloidal silver solution is produced (according to known principles) by reduction (of $Ag_2O$) in very dilute solution by means of a reducing mixture obtained by treating albumen with NaOH in dilute solution.

Of this colloidal silver solution a quantity corresponding to about 300 g. silver is introduced into a solution of about 320 g. of boro-glucosides. The boro-glucosides employed in this example is presumed to consist of a mixture of the glucosides contained in Rhizoma Rhei (thus comprising the primary as well as the secondary glucoside thereof). A suitable glucoside preparation of this character can for example be produced as follows. A solution of the primary double glucoside is first produced by treating Rhizoma Rhei with a solution of borax and alkali carbonate (for ex. potash carbonate). A solution of the secondary glucosides is then produced by treating the solid residuum from this first extraction with a boric acid solution. The two solutions so obtained can then be mixed and evaporated to the desired degree of concentration. The so obtained product consists of a mixture of the primary and secondary glucosides (of Rhizoma Rhei) with boron in complex combination.

The mixture of colloidal silver solution and boro-glucosides is heated in water bath to 50° C. and is thereupon evaporated in vacuum at 40° C. to syrupy consistency. The solution is then poured on to glass plates and dried at a temperature of 40° C.

The resulting product consists of brown-black scales. It is not hygroscopic but readily soluble in water with slightly acid reaction. The solution of same under incident light has a colloidal appearance, opaque greyish brown. In transmitted light it appears clear and of reddish brown colour. The preparation has a very strong bactericide power and has been found to give very good results in the treatment of gonorrhea and other diseases of the mucous membranes.

A product obtained according to the above example will contain about 21 per cent of silver. It is a colloidal silver-glucoside-boro-albuminate having a slightly acid reaction. Its acid character is due to the complex combination of boric acid and glucosides to the colloidal silver wherein albumen acts as a protective colloid.

In the example the acidity is attained by means of boric acid which has on beforehand been taken up into the glucoside, but the boric acid can, however, as above explained be wholly or in part substituted for by other substances of an acid character provided these substances are of such a character as not to effect precipitation of the albumen or the silver. Further it is no necessary condition that the acid substance is present in combination with the glucoside before the silver is incorporated in that it can be introduced at other stages of the process of producing the preparation. The albumen can of course be substituted for by other proteids or other substances which are known to act as protective colloids. The protective colloid should be of such a nature as to be precipitated by strong acids but not of the substance employed to produce acidity.

I claim:

1. A colloid silver preparation comprising a boro-glucoside obtained from Rhizoma Rhei in complex combination with the silver.

2. As a new product colloidal silver incorporated into a glucoside from Rhizoma Rhei.

3. As a new product a water soluble boro-glucoside preparation comprising a glucoside from Rhizoma Rhei.

4. The process which comprises the steps of treating Rhizoma Rhei with an alkaline solution of a boric acid salt, separating the undissolved residuum from the solution evaporating the solution and mixing a colloidal silver solution therewith.

5. The process which comprises the steps of treating Rhizoma Rhei with an alkaline solution of a boric acid salt, separating the undissolved residuum from the solution evaporating the solution, treating the residuum with a boric acid solution, evaporating the solution and incorporating a colloidal silver solution into the same.

6. The process which comprises the steps of treating Rhizoma Rhei with an alkaline solution of a boric acid salt, separating the undissolved residuum from the solution, treating the residuum with a boric acid solution, mixing the resulting solution with the solution from the first treatment of the Rhizoma Rhei, evaporating the solution and incorporating a colloidal silver solution into the same.

In testimony whereof I have signed my name to this specification.

PER LALAND.